United States Patent [19]

Aron et al.

[11] Patent Number: 5,341,410
[45] Date of Patent: Aug. 23, 1994

[54] CELLULAR TELEPHONE LOCATOR USING A MOBILE DATA SYSTEM

[75] Inventors: Carl R. Aron, New York, N.Y.; James L. Troe, Morristown, N.J.

[73] Assignee: RAM Mobile Data USA Limited Partnership, Woodbridge, N.J.

[21] Appl. No.: 918,309

[22] Filed: Jul. 21, 1992

[51] Int. Cl.[5] .......................................... H04M 11/00
[52] U.S. Cl. ....................................... 379/59; 379/58; 379/63; 455/33.1
[58] Field of Search ....................... 379/58, 59, 60, 63; 455/33.1, 33.2, 54.1, 54.2, 56.1

[56] References Cited

U.S. PATENT DOCUMENTS

| | | | |
|---|---|---|---|
| 4,562,572 | 12/1985 | Goldman et al. | 370/80 |
| 4,658,416 | 4/1987 | Tanaka | 379/57 |
| 4,700,374 | 10/1987 | Bini | 379/58 |
| 4,713,808 | 12/1987 | Gaskill et al. | 370/94 |
| 4,752,951 | 6/1988 | Konneker | 379/211 |
| 4,833,701 | 5/1989 | Comroe et al. | 379/60 |
| 4,897,835 | 1/1990 | Gaskill et al. | 370/94.1 |
| 4,901,340 | 2/1990 | Parker et al. | 379/60 |
| 4,980,907 | 12/1990 | Raith et al. | 379/63 |
| 5,020,090 | 5/1991 | Morris | 379/58 |
| 5,020,091 | 5/1991 | Krolopp et al. | 379/58 |
| 5,090,050 | 2/1992 | Heffernan | 379/60 |
| 5,189,632 | 2/1993 | Paajanen et al. | 379/58 X |
| 5,210,787 | 5/1993 | Hayes et al. | 379/60 |

OTHER PUBLICATIONS

Straw Man for Automatic Roaming, Electronic Industries Assoc. Jun. 18, 1985, pp. 1–9.
Raj, Kishore, "Let's Expand Our Roaming Network; Cellular Industry Growth Hinges on It"; 27 Communications News, No. 4, 40 (1990).
Briere, Daniel, Virtual Net Providers Mull Cellular Access Questions; Carriers Must Try to Provide for Roaming Callers, 9 Network World, No. 4, 11 (1992).

Primary Examiner—Curtis Kuntz
Assistant Examiner—G. J. Oehling
Attorney, Agent, or Firm—Kenyon & Kenyon

[57] ABSTRACT

A mobile data terminal which is located proximate to a cellular telephone unit is used to provide customer location information from a foreign cellular telephone service region to the cellular telephone service region in which the customer is a cellular telephone service subscriber. The mobile data terminal provides identification data to a mobile data base radio station located in the foreign cellular telephone service region. The cellular telephone network control center of the cellular telephone service region in which the customer is a subscriber is informed of the foreign cellular telephone service region in which the customer is currently located, possibly through the use of a national clearing house. In this manner, the customer can be reached on the cellular telephone unit in the foreign cellular telephone service region.

36 Claims, 5 Drawing Sheets

CELLULAR TELEPHONE LOCATOR USING A MOBILE DATA SYSTEM

FIELD OF THE INVENTION

The present invention is a method and system for locating a cellular telephone customer and, in particular, a method and system for locating a cellular telephone user who is currently outside of the region in which the user subscribes to cellular telephone service. The present invention involves the use of a two-way mobile data terminal located proximate to the cellular telephone.

BACKGROUND OF THE INVENTION

Cellular telephone service in the United States is provided by numerous companies which provide service in separate geographical regions. The Federal Communications Commission (FCC) has licensed two cellular carriers in each Metropolitan Service Area (MSA) and Rural Service Area (RSA), of which there are 306 and 428, respectively. The service area within each individual region is divided into many distinct sub-regions, commonly referred to as cells.

Each cell within a region contains a single cell-site control system (CSC), which is composed of a processor, one or more radio receiver/transmitters, and one or more radio antennas. The CSCs in a region are connected to a network control system (NCS), which controls all cellular telephone connections within that region. The NCS is, in turn, connected to one or more wireline telephone company central offices (COs) in the region.

Each CSC is responsible for all customers having a cellular telephone presently located in the corresponding cell. In particular, when a cellular telephone is turned on, it may transmit a signal indicating that it is ready to place and/or receive calls. This signal is received by CSCs in the immediate area. The received signals are then fed to the NCS. The CSC that receives the signal the strongest is generally the CSC that is contained in the cell in which the cellular telephone is located. As such, the NCS makes the particular CSC responsible for supporting calls involving that cellular telephone.

If a call is placed or received by that telephone, the NCS transmits the voice signals, as well as the data signals necessary for setting up and controlling the voice signals, to the responsible CSC. The CSC sends a data message to the mobile telephone, assigning that telephone an unoccupied pair of frequencies in which signals are to be transmitted and received (the transmitting frequency being different than the receiving frequency). Thereafter, all of the signals transmitted during the cellular phone call are handled by the responsible CSC on the assigned frequencies.

If, during a conversation, the cellular telephone, which may be located in an automobile, for example, moves from one cell to another, signals may be received stronger by the CSC in the new cell, in which case, the NCS may make the CSC in the new cell responsible for that cellular telephone, and the call in progress is handed-off to the new cell.

However, because different companies provide cellular telephone service to the various regions throughout the United States, complications may arise when a customer of a first company which services a first (home) region is located in a second (foreign) region serviced by a second company ("roaming"). Some cellular carriers have entered into roaming agreements pursuant to which they will provide service to each other's subscribers. Indeed, the NCSs of the regions may, but need not, be connected to support such conversations. As such, placing a call by a customer in a foreign region may be as simple as dialing the area code and number. Calls originated by the roaming subscriber are handled by the foreign systems, and applicable charges are billed to the subscriber's home system operator. Substantial premiums may apply to calls originated by roaming subscribers.

However, problems arise in locating a customer in a foreign region (serviced by a different company) so that calls can be received by the customer. In a cellular telephone system having a "Standard Roaming" feature, a party desiring to reach a customer in a foreign region must know the particular foreign region in which the customer is located, which of the two systems in the foreign region is providing service to the roaming cellular telephone, and the access number of the NCS of the service providing system in the foreign region. The party must then dial the access number followed by the area code and local number in order to call the customer.

In a cellular system having a "Follow Me Roaming" ® feature (registered trademark of GTE Mobilnet), once a customer enters a foreign region, he may press particular buttons on his cellular telephone in order to activate Follow Me Roaming, i.e., he may transmit a signal to the nearest CSC in order to notify the NCS in the foreign region and, in turn, the NCS in the home region that he is presently located in the foreign region. A party desiring to call the customer would then need to dial only the area code and local number, because the home NCS knows to which foreign NCS to route the call, i.e., the home NCS knows in which foreign region the customer is located.

The customer must activate Follow Me Roaming in each new region into which the customer travels by pressing the particular buttons on the cellular phone. Inconvenience to the cellular telephone user arises because (a) the subscriber must first know that he/she has, in fact, entered into a foreign cellular service area, (b) the subscriber must manually activate the Follow Me Roaming feature, and (c) when on an extended journey which traverses many foreign cellular service areas, the subscriber must continually be aware of his/her entering into a new area and must activate the Follow Me Roaming feature again and again. Deactivation of Follow Me Roaming is achieved by pressing other buttons on the cellular phone.

To eliminate this inconvenience on the customer, it is also known for a cellular telephone to provide identification information (i.e., the I.D. of the unit's home NCS) automatically, immediately after being turned on in a foreign region. As in systems having Follow Me Roaming, the foreign NCS then notifies the home NCS of the whereabouts of the customer, allowing callers to dial only the local telephone number in order to reach the customer. However, such a feature is not available in many regions of the United States.

Moreover, when a call is forwarded to a cellular telephone subscriber in a foreign region, the subscriber is charged for the air time and for the long distance portion of the call, even if the subscriber receives an unwanted ("nuisance") call.

SUMMARY OF THE INVENTION

The present invention provides a method and system for informing a company, to the cellular telephone service of which a customer is a subscriber, of the current location of the customer. The principles according to the present invention may be applied, for example, in a situation where a customer having both a cellular telephone unit and a mobile data terminal in his automobile travels from the region which the subscribing company serves (the home region) to another region (a foreign region).

In a first embodiment of the present invention, immediately after being turned on, the mobile data terminal automatically transmits the customer identification information (e.g., a telephone number stored in the mobile data terminal), home region identification information (e.g., the data system address for the data terminal of the subscriber company), and the coded location of the nearest (mobile data) base radio station to the nearest base radio station associated with the mobile data communications network. Only once, at the time of cellular service initiation, this identification information is programmed into a software application program in the mobile data terminal. The coded location of the base radio station is transmitted by the base radio station itself to the mobile data terminal. Informing the mobile data terminal of this location information simplifies the software resident in the mobile data terminal, although such a transmission need not take place.

The base radio station may then transmit this identification information and the coded location of the base radio station to a national clearing house, which then uses a look-up table, for example, to determine the foreign region in which the customer is currently located (based upon the location of the particular base radio station). The clearing house then transmits data identifying the customer and the foreign region to the cellular NCS of the home region so that the customer can be reached by simply dialing the customer's local telephone number. Alternatively, the clearing house can be eliminated, in which case the information can be transmitted directly from the base radio station to the NCS of the home region, and the look-up operation can take place either in the mobile data terminal or in the NCS of the home region.

In a second embodiment of the present invention, the mobile data terminal is electrically coupled to the cellular telephone unit. Data identifying the home region address and the foreign region is transmitted from the cellular telephone unit to the mobile data terminal. This data, along with data identifying the particular customer, is then automatically transmitted to a clearing house via the nearest base radio station of the mobile data system. The data identifying the particular customer and the foreign region (including the particular service provider for that foreign region) in which the customer is currently located is then transmitted from the clearing house to the cellular NCS of the subscriber's home region. Once again, the clearing house can be eliminated, and the information can be transferred directly from the base radio station of the mobile data system to the NCS of the home region. In this situation, the mobile data terminal or the NCS of the home cellular system region could perform any required processing of the information identifying the foreign region.

In comparison to the above-described conventional features of a cellular telephone system, a location service employing the principles according to the present invention provides back-up and/or alternative capabilities which may be more convenient for the cellular telephone subscriber. Moreover, in another embodiment of the present invention, the subscriber has the capability to reject nuisance calls, and thus avoid being charged for such.

DETAILED DESCRIPTION

Figure 1A:
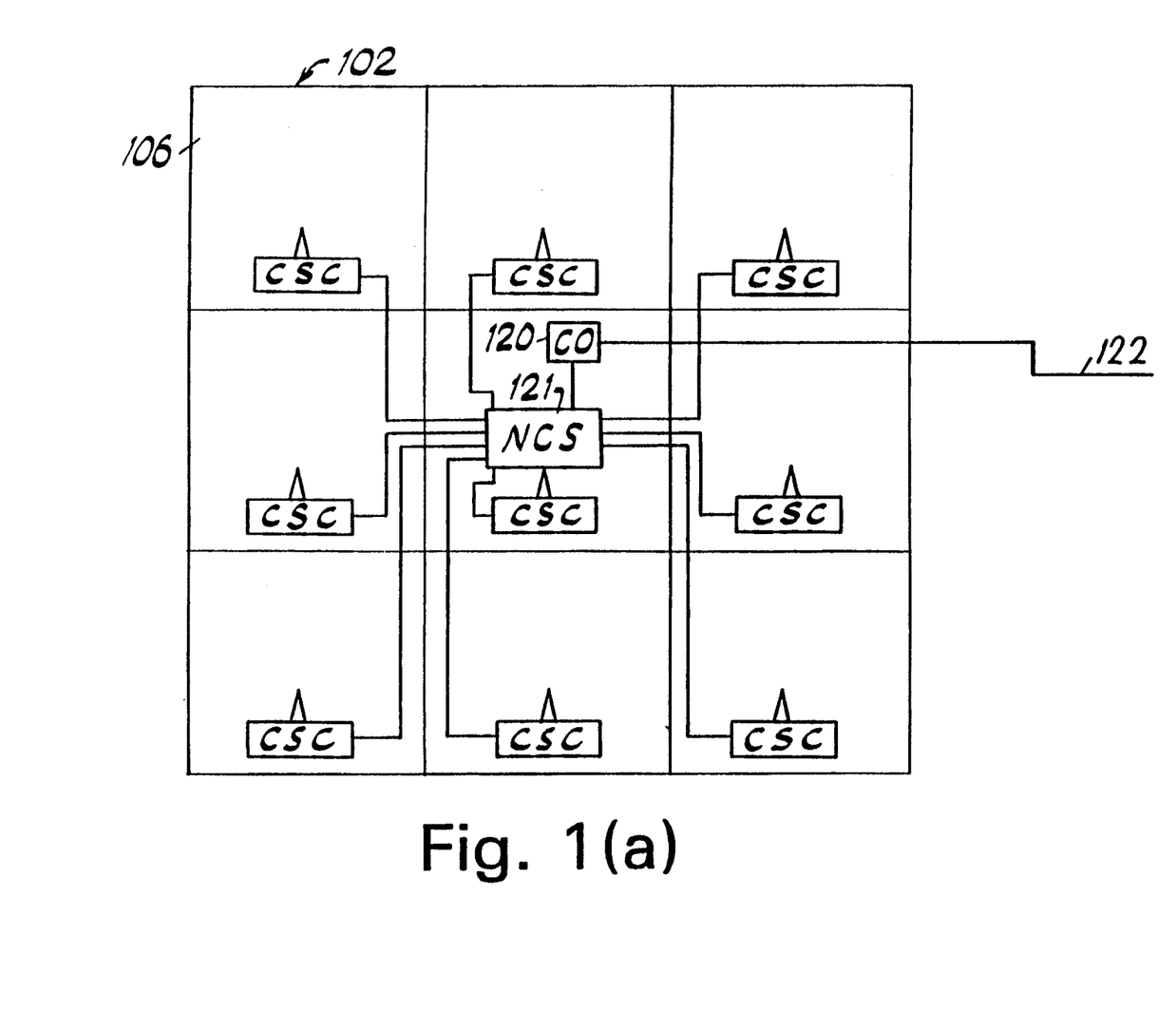
FIGS. 1(a) and 1(b) show a block diagram of the structure of two cellular telephone regions.
Figure 1B:
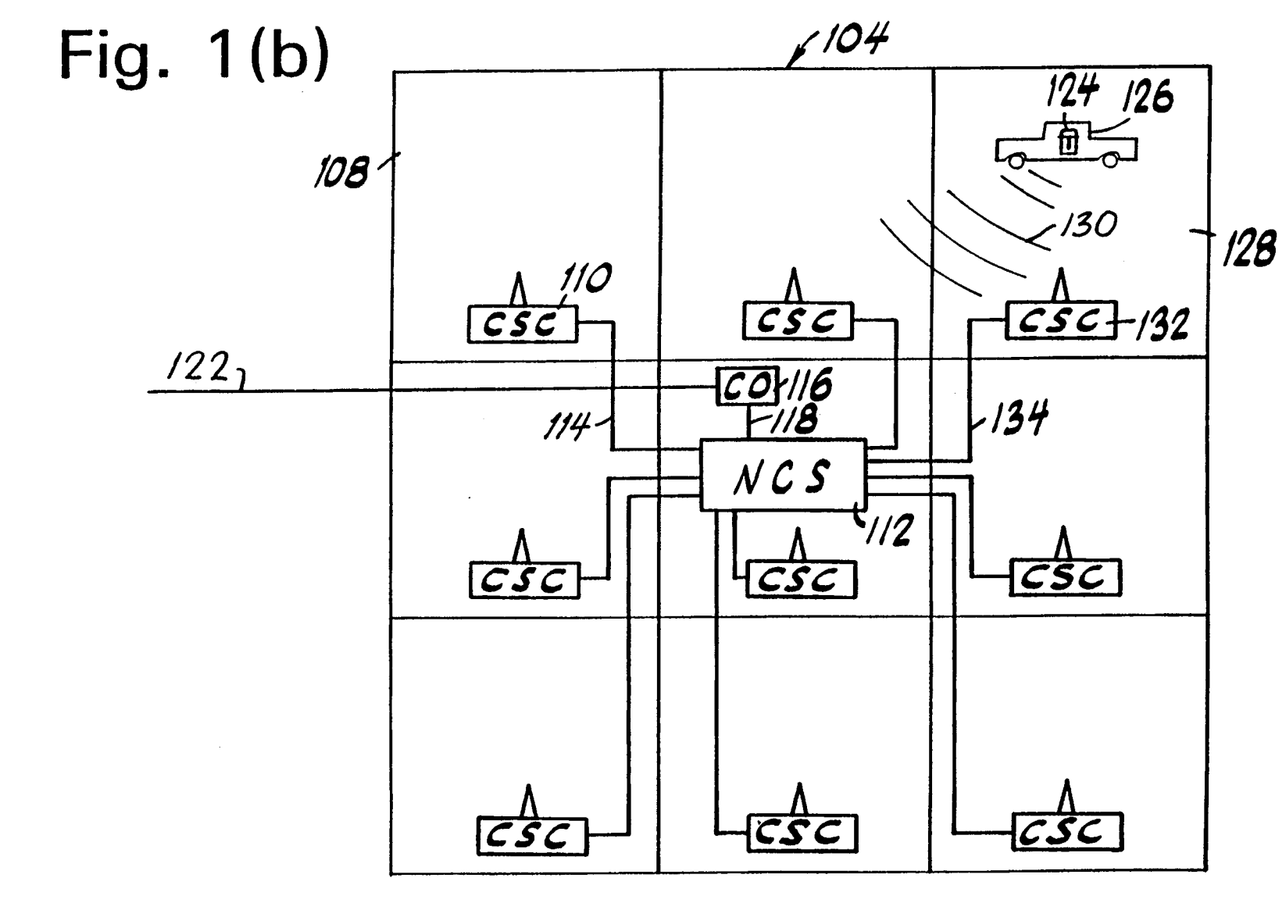

Referring to FIG. 1, there is shown the structure of two cellular telephone regions, i.e., a home region 102 and a foreign region 104. Home region 102 is divided into several cells 106. Foreign region 104 is similarly divided into several cells 108.

The structure of the two regions, 102 and 104, is analogous, and, therefore, for clarity purposes, generally only the foreign region 104 will be described. Each of the cells 108 of the foreign region 104 contains a CSC 110 which is connected to a NCS 112 of the region through a wire 114, for example. The NCS 112 is, in turn, connected to a CO 116 of the region through a wire 118, for example.

The CO 116 of the foreign region 104 is connected to the CO 120 of the home region 102, over a voice line 122, for example, and the CO 120 of the home region 102 is connected to an NCS 121 of the home region 102 in order to allow customers in the foreign region 104 to be reached by parties in the home region 102.

As shown in FIG. 1, a customer who has a cellular telephone unit 124 in his automobile 126 and who subscribes to a cellular telephone service provided by a home company in home region 102 travels to foreign region 104. In particular, the customer is geographically located in cell 128 of foreign region 104. If the customer desires to place or receive a cellular telephone call, he must turn on the cellular telephone 124. Because, in this case, the radio signals from the CSC 132 of cell 128 are the ones that are the strongest received by the telephone 124, the customer will be serviced by cell 128. Depending upon the particular features, if any, available (as described above), it may be possible that identification signals 130 from the telephone 124 may either be transmitted automatically after the telephone 124 is turned on or transmitted upon the customer pressing particular buttons on the telephone 124. NCS 112 may, in certain cases, be able to notify NCS 121 of home region 102 that the particular customer is presently located in foreign region 104.

Thereafter, if a party in home region 102 desires to place a call to the customer, he may need to dial only the local telephone number of the customer. Because NCS 121 knows that the customer is presently located in foreign region 104, NCS 121 routes the call to CO 116 over line 122, and then to NCS 112 over line 118. CO 116 then connects the call through to telephone 124 via NCS 112 and CSC 132 through lines 118 and 134, which carry both voice and data signals.

Figure 2:
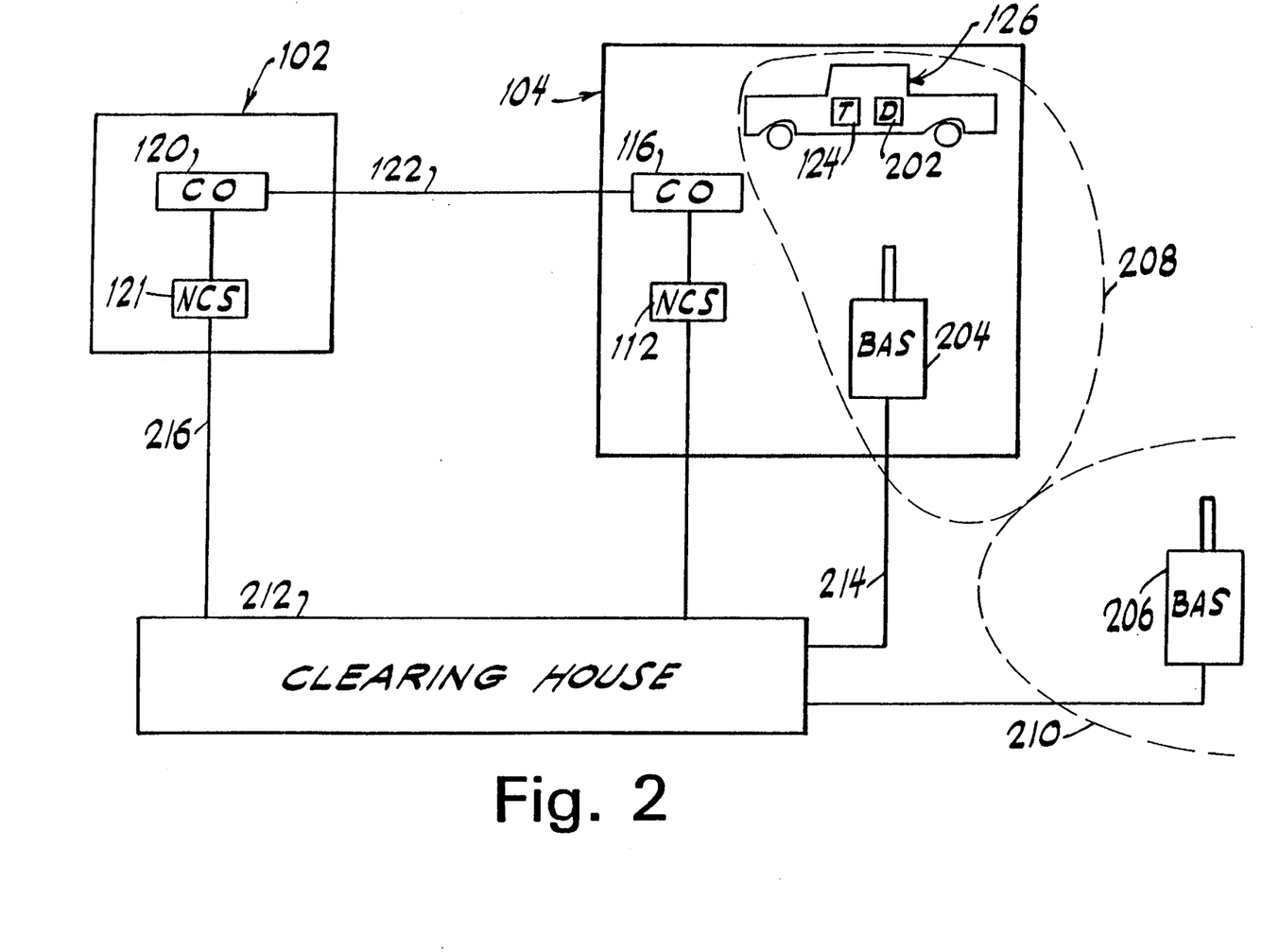
FIG. 2 shows a block diagram illustrating the principles of a first embodiment of the present invention.

Referring now to FIG. 2, there is shown a block diagram illustrating the principles of a first embodiment of the present invention. Similar to FIG. 1, a home region 102 and a foreign region 104 are shown in FIG. 2. The automobile 126 in FIG. 2, however, not only contains a cellular telephone unit 124, but also contains a mobile data terminal 202, which is used to locate the telephone 124 in the cellular telephone system.

The mobile data terminal 202 is part of a mobile data network that may extend throughout the United States, for example, the MOBITEX ® (registered trademark of Swedish Telecom) mobile data network manufactured by Ericsson Mobile Communications AB. The mobile data network is used to transmit data information, as opposed to voice information, between data terminals throughout the United States. In the case of the U.S. Mobitex system now under construction, the data is passed at a speed of 8,000 bits per second over a frequency range of 896–901 MHz (from a mobile data terminal) and 935–940 MHz (from a base radio station), for example.

The mobile data network includes many mobile data base radio stations (204, 206) that are contained in, and are responsible for, distinct areas (208 and 210, respectively) of the network, as shown by dashed lines in FIG. 2. These mobile data base radio stations are the access nodes for the mobile data terminals located in the corresponding areas. The mobile data base radio stations are interconnected by a mobile data network.

Unlike the regions of a cellular telephone system, the areas of a national mobile data network are serviced by a single company. As such, many of the complications resulting from communication between regions in a cellular telephone system are alleviated in a mobile data network. As illustrated in FIG. 2, the regions of a cellular telephone system do not necessarily correspond to the areas of a mobile data network.

The mobile data terminal 202 automatically notifies the data network when it is switched on. Unlike in a cellular telephone system, the base radio station used by the mobile data terminal is selected by the mobile data terminal itself, not by the network. The particular base radio station is selected based on the strength of the signals received from the base radio stations. Each mobile data terminal constantly monitors the strength of signal reception so that when it moves from an area covered by one base radio station into an area covered by another, a signal is sent by the terminal to the new base radio station, informing the network that all subsequent data to the terminal should be routed through the new base radio station.

The present invention provides various ways in which a mobile data terminal can be used to provide the current location of a customer having a cellular telephone contained in the same automobile, for example, when the automobile is in a foreign region. It is assumed below that the customer is a subscriber to both a cellular telephone service and a mobile data service applying the principles according to the present invention.

In a first embodiment of the present invention, as illustrated in FIG. 2, through the operation of application software the mobile data terminal 202 automatically transmits a data message over mobile data base radio station 204 and data line 214. The data message contains customer identification information (e.g., the customer's cellular telephone number, which may be preprogrammed into, and stored in, the data set of the mobile data terminal), home region identification information (e.g., the mobile data system address of the NCS of the subscriber company), and the coded location of the mobile data base radio station 204 with which the mobile data terminal 202 communicates. This coded location information is provided by the mobile data base radio station itself in order to simplify the software in the mobile data terminal 202. The data message is sent to a national clearing house 212 or any other designated facility. Home region identification information can be stored in the mobile data terminal 202, or the clearing house 212 may instead use a look-up table, for example, to determine the address of the company to which the identified customer subscribes (based upon the customer's telephone number).

In either situation, another look-up table, for example, may then be used to correlate automatically (the identification number of) the particular mobile data base radio station 204, from which the data was transmitted, to the cellular telephone service region 104 (e.g., the city code) in which the mobile data base radio station is physically located.

The clearing house 212 can then transmit the data identifying the customer and the foreign region 104 in which the customer is currently located to home region 102 (i.e., to the mobile data system address of the NCS 121 of the subscriber company) in a short (economical) message over data line 216. In this manner, calls from home region 102 to the local telephone number of the customer can be routed by the subscriber's home cellular telephone company to foreign region 104 (i.e., to the foreign cellular telephone company that services the city in which the customer is currently located) in order to reach the customer, as described above.

It is to be understood that the determination of the foreign region based upon the particular base radio station through the use of a look-up table may instead be automatically performed in (the application software of) the mobile data terminal, or manually or automatically performed in the NCS of the home region itself, rather than in a clearing house. In such situations, the use of a clearing house is not necessary, and the identification information is transmitted directly from the mobile data base radio station 204 to the NCS 121 of the home cellular telephone region 102 over data network line 404, as shown in FIG. 4.

Figure 3:
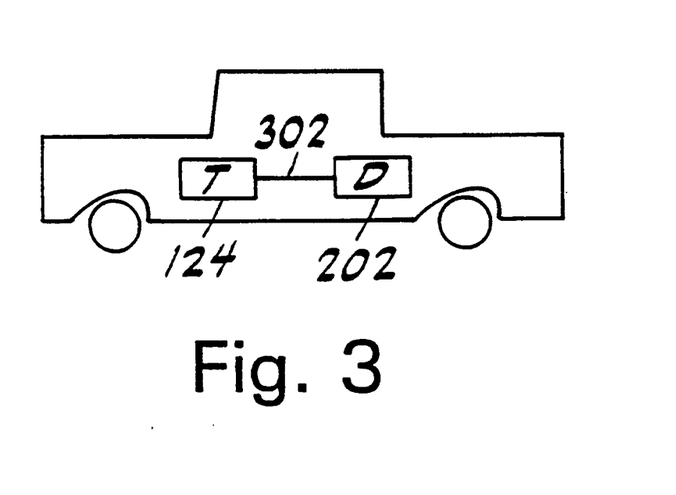
FIG. 3 shows a block diagram illustrating the principles of a second embodiment of the present invention.

In a second embodiment of the present invention, the cellular telephone unit 124 is electrically coupled to the mobile data terminal 202 over, for example, a wire 302, as shown in FIG. 3. Referring simultaneously to FIGS. 1 and 3, mobile data terminal 202 receives, over wire 302, information from the cellular telephone 124. In particular, the terminal 202 receives information identifying the home cellular telephone region 102 in which the customer is a subscriber, and the foreign cellular telephone region 104 in which the customer is currently located. This second piece of information may be provided to the telephone 124 by the NCS 112.

The mobile data terminal 202 then transmits the data identifying the home region and the current foreign region, as well as data identifying the particular customer, to the clearing house 212 via the mobile data base radio station 204. The clearing house 212 then transmits the data identifying the foreign cellular telephone region 104 in which the customer is located to the home cellular telephone region 102, via data line 216. Once again, this enables the customer to be reached on the cellular telephone 124 through the customer's local telephone number.

Figure 4:
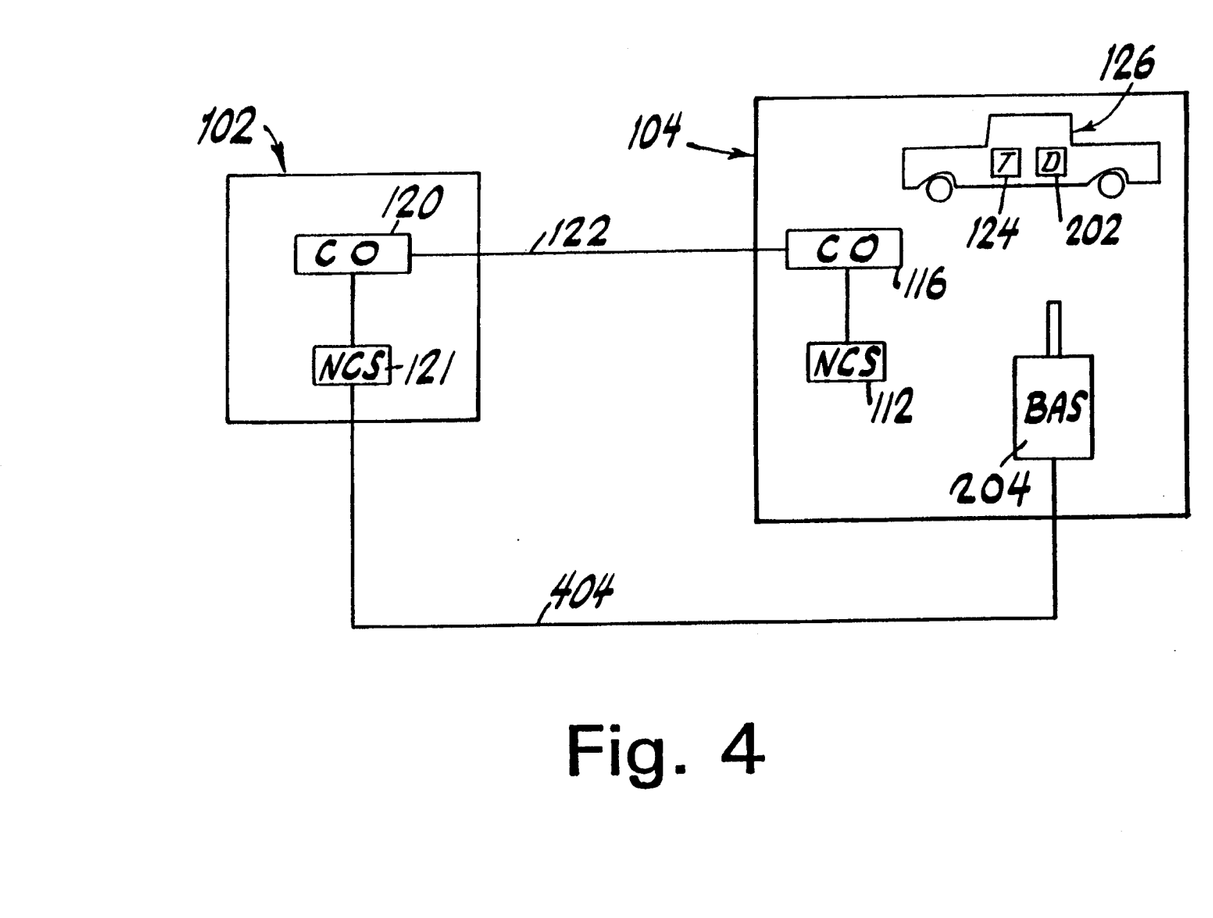
FIG. 4 shows a block diagram illustrating the principles of an alternative first embodiment of the present invention.

Once again, the clearing house may be eliminated, in which case the identification information is transmitted directly from the base radio station to the NCS of the home region, as shown in FIG. 4 with respect to the first embodiment of the present invention. In such a situation, either the mobile data terminal or the NCS of the home region can perform any required processing of the information identifying the foreign region.

Figure 5:
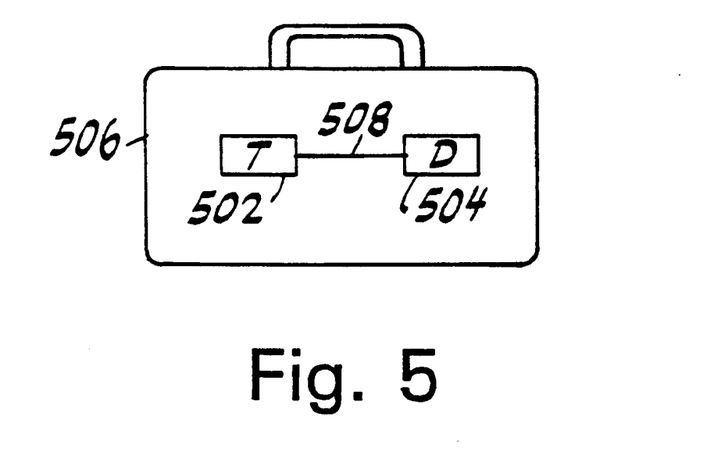
FIG. 5 shows an alternative location of a cellular telephone unit and mobile data terminal.

As shown in FIG. 5, the cellular telephone 502 and the mobile data terminal 504 may be hand-carried by the subscriber in a portable unit such as a suitcase-like container 506, rather than being located in an automobile. Depending upon the particular embodiment of the present invention being implemented, the cellular telephone 502 may be electrically coupled to the mobile data terminal 504 over a wire 508 and/or may be combined (integrated) in a single device.

The present invention further provides that when a customer moves from an area covered by a mobile data base radio station to an area covered by another mobile data base radio station, but remains within the same cellular system service region, logic may be used in the clearing house, for example, to prevent such information from being transmitted to the NCS of the home telephone service region. The home region needs to be informed only when the customer moves into a different cellular telephone service region. The logic therefore eliminates the transmission of these types of unnecessary messages.

Moreover, in another embodiment of the present invention, when a party places a call to the cellular telephone subscriber, the NCS of the home region first formats and sends a mobile data message to the subscriber's mobile data terminal that displays the telephone number of the calling party. The cellular telephone subscriber then has the option of accepting or rejecting the call by pressing an appropriate key on the mobile data terminal that, in turn, sends an accept or reject message back to the NCS. In this manner, the cellular telephone subscriber has the capability to reject nuisance calls, and thus avoid air time and long distance charges for such calls.

The principles of the present invention may also be applied to a telephone system that supports a "single number" service. The single number service provides a subscriber with one telephone number associated with the subscriber himself, as opposed to the specific telephone that he is currently using (as is commonly done). To call a subscriber of this service, the personal number of that subscriber is dialed into the telephone network. The telephone company, which provides the single number service and which must be aware of the present location of the subscriber, directs the call to whereever the person is via whatever communication service (e.g., cellular telephone service) the subscriber is currently using.

In particular, in an embodiment of the present invention, a "gateway", which includes software-controlled switches and other circuitry, couples the telephone network to a mobile data network. Through utilizing the principles of the present invention, as explained above, the mobile data network is used to provide the switching center of the telephone company with the location information necessary to properly direct the call. That is, via the gateway, the telephone company is informed of the location (e.g., the city) of the cellular telephone service that the subscriber is currently using, and hence the present location of the subscriber. As such, telephone calls for the "single number" subscriber can be directed to the cellular telephone system operating in the city in which the subscriber is presently located.

What is claimed is:

1. A method of informing a home cellular telephone service region of a cellular telephone network of a location of a customer having a cellular telephone unit located proximate to a mobile data terminal in a foreign cellular telephone service region of the cellular telephone network comprising the steps of:
   automatically providing a first signal identifying the customer from the mobile data terminal to a mobile data base radio station of a mobile data network;
   determining the foreign cellular telephone service region in which the customer is located based upon a location of the mobile data base radio station; and
   transmitting data identifying the customer and the foreign cellular telephone service region in which the customer is located from the mobile data base radio station to the home cellular telephone service region of the customer.

2. The method according to claim 1, wherein the determining step includes the step of determining the identity of a foreign cellular telephone service provider to which the customer has access.

3. The method according to claim 1, further comprising the step of automatically providing a second signal identifying the home cellular telephone service region from the mobile data terminal to the mobile data base radio station.

4. The method according to claim 3, wherein the first and second signals are provided from the mobile data terminal immediately after the mobile data terminal is turned on.

5. The method according to claim 1, wherein the data identifying the customer and the foreign cellular telephone service region is transmitted from a clearing house to the home cellular telephone service region.

6. The method according to claim 1, wherein the foreign cellular telephone service region is determined through the use of a look-up table.

7. The method according to claim 1, wherein the cellular telephone unit and the mobile data terminal are contained within an automobile.

8. The method according to claim 1, wherein the cellular telephone unit and the mobile data terminal are integrated in a hand-carried, portable unit.

9. The method according to claim 1, further comprising the step of routing a telephone call for the customer from the home cellular telephone service region to the foreign cellular telephone service region.

10. The method according to claim 1, further comprising the step of transmitting a telephone number of a party calling the customer from the home cellular telephone service region to the foreign cellular telephone service region.

11. A method of informing a home cellular telephone service region of a cellular telephone network of a location of a customer having a cellular telephone unit electrically coupled to a mobile data terminal in a foreign cellular telephone service region of the cellular telephone network, comprising the steps of:
   transmitting a first data signal identifying the foreign cellular telephone service region in which the customer is located from the foreign cellular telephone service region to the cellular telephone unit;

transmitting the first data signal from the cellular telephone unit to the mobile data terminal;

transmitting the first data signal, a second data signal identifying the home cellular telephone service region of the customer, and a third data signal identifying the customer from the mobile data terminal to a mobile data base radio station of a mobile data network; and transmitting the first and third data signal from the mobile data base radio station to the home cellular telephone service region of the customer.

12. The method according to claim 11, wherein the transmission from the cellular telephone unit to the mobile data terminal includes the step of transmitting the identity of a foreign cellular telephone service provider to which the customer has access.

13. The method according to claim 11, wherein the first, second and third data signals are automatically transmitted immediately after the mobile data terminal is turned on.

14. The method according to claim 11, further comprising the steps of:

transmitting the first, second and third data signals from the base radio station to a clearing house; and transmitting the first and third data signals from the clearing house to the home cellular telephone service region.

15. The method according to claim 11, wherein the cellular telephone unit and the mobile data terminal are contained within an automobile.

16. The method according to claim 11, wherein the cellular telephone unit and the mobile data terminal are integrated in a hand-carried, portable unit.

17. The method according to claim 11, further comprising the step of routing a telephone call for the customer from the home cellular telephone service region to the foreign cellular telephone service region.

18. The method according to claim 11, further comprising the step of transmitting a telephone number of a party calling the customer from the home cellular telephone service region to the foreign cellular telephone service region.

19. A system for informing a home cellular telephone service region of a cellular telephone network of a location of a customer having a cellular telephone unit located proximate to a mobile data terminal in a foreign cellular telephone service region of the cellular telephone network, comprising:

means for automatically providing a first signal identifying the customer from the mobile data terminal to a mobile data base radio station of a mobile data network;

means for determining the foreign cellular telephone service region in which the customer is located based upon a location of the mobile data base radio station; and means for transmitting data identifying the customer and the foreign cellular telephone service region in which the customer is located from the mobile data base radio station to the home cellular telephone service region of the customer.

20. The system according to claim 19, wherein the means for determining includes means for determining the identity of a foreign cellular telephone service provider to which the customer has access.

21. The system according to claim 19, further comprising means for automatically providing a second signal identifying the home cellular telephone service region from the mobile data terminal to the mobile data base radio station.

22. The system according to claim 21, wherein the first and second signals are provided from the mobile data terminal immediately after the mobile data terminal is turned on.

23. The system according to claim 19, wherein the data identifying the customer and the foreign cellular telephone service region is transmitted from a clearing house to the home cellular telephone service region.

24. The system according to claim 19, wherein the foreign cellular telephone service region is determined through the use of a look-up table.

25. The system according to claim 19, wherein the cellular telephone unit and the mobile data terminal are contained within an automobile.

26. The system according to claim 19, wherein the cellular telephone unit and the mobile data terminal are integrated in a hand-carried, portable unit.

27. The system according to claim 19, further comprising means for routing a telephone call for the customer from the home cellular telephone service region to the foreign cellular telephone service region.

28. The system according to claim 19, further comprising means for transmitting a telephone number of a party calling the customer from the home cellular telephone service region to the foreign cellular telephone service region.

29. A system for informing a home cellular telephone service region of a cellular telephone network of a location of a customer having a cellular telephone unit electrically coupled to a mobile data terminal in a foreign cellular telephone service region of the cellular telephone network, comprising:

means for transmitting a first data signal identifying the foreign cellular telephone service region in which the customer is located from the foreign cellular telephone service region to the cellular telephone unit;

means for transmitting the first data signal from the cellular telephone unit to the mobile data terminal;

means for transmitting, from the mobile data terminal to a mobile data base radio station of a mobile data network, the first data signal, a second data signal identifying the home cellular telephone service region of the customer, and a third data signal identifying the customer; and means for transmitting the first and third data signals from the mobile data base radio station to the home cellular telephone service region of the customer.

30. The system according to claim 29, wherein the means for transmitting from the cellular telephone unit to the mobile data terminal includes means for transmitting the identity of a foreign cellular telephone service provider to which the customer has access.

31. The system according to claim 29, wherein the first, second and third data signals are automatically transmitted immediately after the mobile data terminal is turned on.

32. The system according to claim 29, further comprising:

means for transmitting the first, second and third data signals from the base radio station to a clearing house; and means for transmitting the first and third data signals from the clearing house to the home cellular telephone service region.

33. The system according to claim 29, wherein the cellular telephone unit and the mobile data terminal are contained within an automobile.

34. The system according to claim 29, wherein the cellular telephone unit and the mobile data terminal are integrated in a hand-carried, portable unit.

35. The system according to claim 29, further comprising means for routing a telephone call for the customer from the home cellular telephone service region to the foreign cellular telephone service region.

36. The system according to claim 29, further comprising means for transmitting a telephone number of a party calling the customer from the home cellular telephone service region to the foreign cellular telephone service region.

* * * * *